INVENTOR.
ALVIN J. WALLMAN
BY
Talbert Dick & Darley
ATTORNEYS

WITNESS
NORMAN G. TRAVISS

Jan. 26, 1965 A. J. WALLMAN 3,167,690
MEANS FOR PREVENTING THE UNAUTHORIZED USE
OF ELECTRICITY THROUGH A METER
Filed April 27, 1962 2 Sheets-Sheet 2
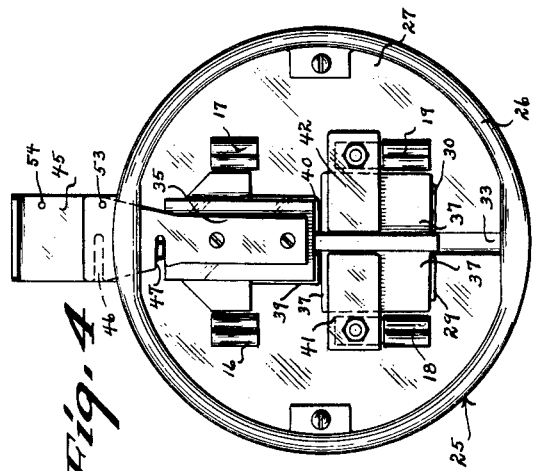
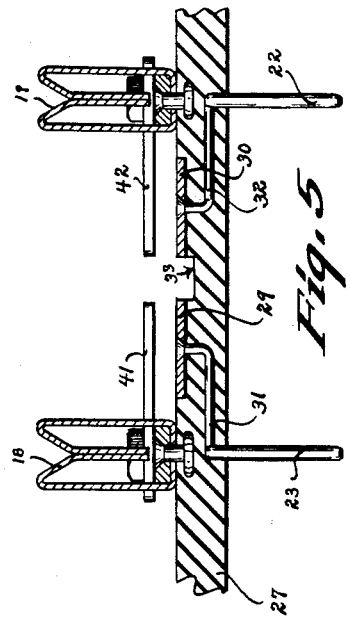
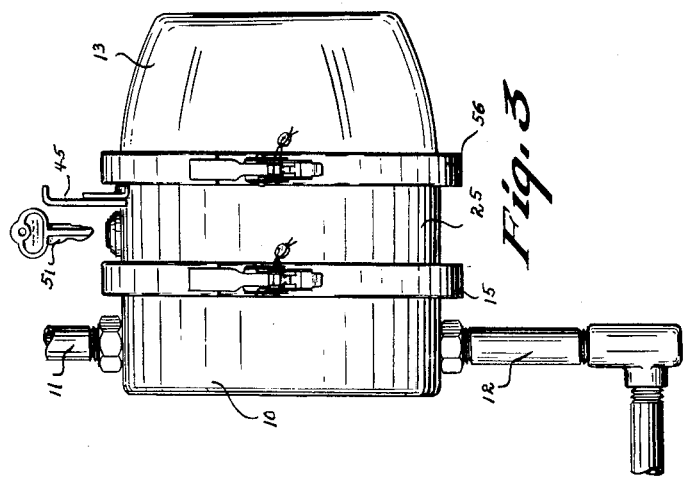
INVENTOR.
ALVIN J. WALLMAN
BY
Talbert Dick & Jarley
ATTORNEYS
WITNESS
NORMAN G. TRAVISS

United States Patent Office 3,167,690
Patented Jan. 26, 1965

3,167,690
MEANS FOR PREVENTING THE UNAUTHORIZED
USE OF ELECTRICITY THROUGH A METER
Alvin J. Wallman, 823 Market St., Beatrice, Nebr.
Filed Apr. 27, 1962, Ser. No. 190,580
1 Claim. (Cl. 317—108)

This invention relates to a means for preventing the unauthorized use of electricity through an electricity use meter.

One of the problems of electricity selling companies is the unauthorized use of the electric power. Such companies run their power lines to point of use, such as a house, factory, or like. The power lines are connected to a use meter at the point of electrical usage, and the user's electric circuitry is connected to the "out going" side of the recording use meter. Obviously as the user uses electric power, it will pass through the meter, and periodically a meter reader will visit the premises and obtain the meter reading so that the user may be billed for the electric power used. Often, however, (and for a variety of reasons) the power company may disconnect the meter connections and/or open the switch to break the circuit leading into the premises. This disconnecting and connecting of services is quite frequent. The problem, of course, is to prevent the connecting and disconnecting of the meter means by others besides the power plant employees. One reason for the problem is that it is a simple matter for anyone to re-connect the meter means or disconnect the same.

Therefore one of the principal objects of my invention is to provide a means that prevents the unauthorized re-connecting or disconnecting of the power company's meter and switch unit means.

A further object of this invention is to provide a lockable means for electricity recording meters that may be easily and quickly installed on most present-day meters.

Still further objects of this invention are to provide a lockable means for electricity recording meters that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claim, and illustrated in the accompanying drawings, in which:

FIG. 3 is a reduced side view of my device installed between the base portion and dial portion of an ordinary electricity use record meter;

FIG. 4 is a reduced front view of my device showing the same in disconnected position for breaking the circuitry of the meter means; and FIG. 5 is a cross-sectional view of my device taken on line 5—5 of FIG. 1, and more fully illustrates its construction.

Figure 1:
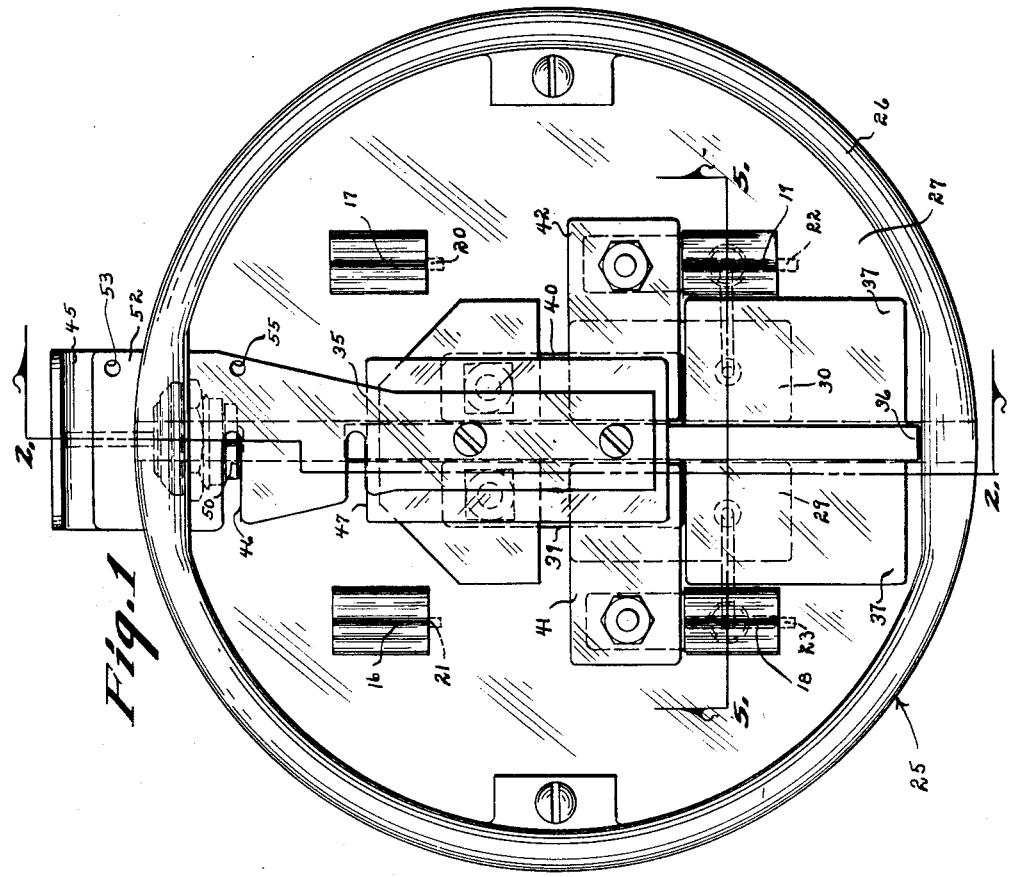
FIG. 1 is a front view of my device.

In the drawings I have used the numeral 10 to generally designate the base portion of an ordinary meter. Such bases have an inlet conduit 11 and an outlet conduit 12. The base 10 is cup shaped with its front open. In the base are the usual four spaced apart female terminal spring sockets for detachably receiving the four knife blade terminals of the usual outer meter recording head 13. The base 10 and rear edge of the head each has a bead portion that is secured together by a clamp ring 15. The four female socket terminals in the base 10 are the same as the four female socket terminals 16, 17, 18 and 19 of my auxiliary unit, and the four knife blade terminals in the head 13 are the same as the blade terminals 20, 21, 22 and 23 of my auxiliary unit. When the head 13 is on the base 10 (without my auxiliary unit) the four male knife blade terminals of the head 13 frictionally detachably extend into the four female socket terminals of the base 10.

Figure 2:
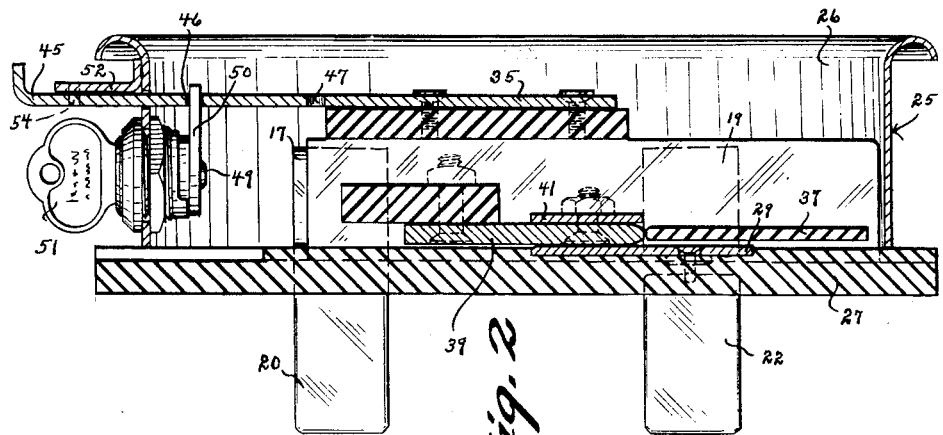
FIG. 2 is a cross-sectional view of the device taken on line 2—2 of FIG. 1.

It is with such present meter equipment that I install my device and which I will now describe in detail. My unit is imposed between the usual base 10 and the usual head 13 as shown in FIG. 3. The numeral 25 generally designates my unit which is in the form of an open cup housing 26. The bottom 27 of the housing 26 is of non-electro conductive material. The four female terminals 16, 17, 18 and 19 extend upwardly from the inside bottom of the cup housing 26 and the blade terminals 20, 21, 22 and 23 extend downwardly from the outside bottom of the cup housing 26. The female socket terminal 16 is electrically directly connected to the knife terminal 21, and the female socket terminal 17 is electrically directly connected to the knife terminal 20. However, the knife terminal 23 is not connected to the female socket terminal 18 and the knife terminal 22 is not connected to the female socket terminal 19. This adjacent but separated structure is shown in FIG. 5. The numeral 29 designates an electro conductive plate imbedded in and flush with the inside top of the bottom 27 and positioned in spaced relationship to the inner side of the terminal 18. The numeral 30 designates an electro-conductive plate imbedded in and flush with the inside top of the bottom 27 and in spaced relation to the inner side of the terminal 19. The plate 29 is connected to the terminal 23 by a lead 31 and the plate 30 is connected to the terminal 22 by the lead 32. The numeral 33 designates a groove in the inside top of the bottom 27 and which runs between the two plates 29 and 30, and substantially the diameter of the bottom 27 as shown in FIG. 2. The numeral 35 designates a carriage frame in the cup housing 26 and slidable in the groove 33. The main portion of this carriage, and especially its part that slides in the groove 33 is of non-electro-conductive material. This portion 36 that extends into the groove 33 is always present and prevents any arcing between the two plates 29 and 30. On the forward end of the carriage 35 and extending adjacently over the plates 29 and 30 is a plate 37 of non-electro-conductive material. The numeral 39 designates an electro-conductive plate on the carriage and directly to the rear of the plate 37. This plate 39 extends over and contacts the plate 29 when the carriage is in its forward sliding position. The numeral 40 designates a second electro-conductive plate on the carriage and directly to the rear of the plate 37. This plate 40 extends over and contacts the plate 30 when the carriage is in a forward sliding position as shown in FIG. 1. The numeral 41 designates a spring metal bar secured at one end to the inside bottom 27 and extending in spaced relationship over the plate 29. The numeral 42 designates a spring metal bar secured at one end to the inside bottom 27, and extending in spaced relationship over the plate 30. When the carriage is in a forward position of its slidable movement the metal bar 41 will be engaging the top of the plate 39 and the plate 39 will be engaging the plate 29. The bar 41 is directly connected to the female socket terminal 18. Also, when the slidable carriage is in a forward position, the metal bar 42 will be engaging the top of the plate 40 and the plate 40 will be engaging the plate 30. The bar 42 is directly connected to the female socket terminal 19. By this arrangement of parts, when the carriage is in its forward sliding position, the knife terminal 23 will be electrically connected to the female terminal 18 and the knife terminal 22 will be electrically connected to the female terminal 19. However, when the carriage is slid rearwardly the two metal bars 41 and 42 will be to the front of the plates 29 and 30, and the spring bars 41 and 42, as shown in FIG. 4. When the carriage is in the position shown in FIG. 4, the knife terminal 23 will be disconnected from the female terminal 18 and the knife terminal 22 will be disconnected from the female terminal 19. To facilitate the manual sliding movement of the carriage 35, I have a handle bar 45, slidably extending through the housing 25 and connected to the carriage. The numerals 46 and 47 designate two spaced apart notches in the handle bar 45. In the wall of the housing 25 I have installed an ordinary key lock 49 having the movable locking finger 50, and which is inside the housing 25 and adjacent the handle 45. The finger 50 is moved toward or away from the handle 45 by the usual key 51. When the handle bar is pushed forwardly the carriage 35 will be moved accordingly forwardly, as shown in FIG. 1. At this time the terminal 18 will be electrically connected to the knife terminal 23, and the terminal 19 will be electrically connected to the knife terminal 22. The notch 46 will be adjacent the finger 50 and by the use of the key 51, the finger of the lock is caused to enter the notch 46 and lock the carriage in the forward position of its movement. When the handle 45 is moved rearwardly and outwardly, the carriage will be moved to a rear position as shown in FIG. 4, and the notch 47 will be adjacent the lock finger 50. By use of the key 51, the finger 50 may be caused to enter the notch 47 and the handle and carriage will be locked in an inoperative open condition. Thus, the carriage may be locked in either a forward or rear position. Only the possessor of the key can change the position of the locked carriage. Also, if desired, a ledge 52 may be formed on the housing 25 having a hole 53 capable of registering with a hole 54 in the handle 45 when the handle 45 is pushed forwardly and capable of registering with a hole 55 in the handle 45 when the handle 45 is pulled outwardly. These holes may be used for the further sealing of the unit by use of such means as sealing wire tags.

As before indicated, my unit is to be placed between the base 10 and head 13 of a meter, and this is accomplished without any change in either the meter base or meter head. The four knife blade terminals 20, 21, 22 and 23 of my unit will enter the four female socket terminals of the base 10 and the four female socket terminals 16, 17, 18 and 19 of my device will receive the four knife blade terminals of the head 13. If desired, a clamping band 56 may engage the adjacent edges of the head 13 and my unit, and the clamping band 15 engage the adjacent edges of the base 10 and my unit as shown in FIG. 3. Once installed the electric current of the circuitry may be locked in connected condition or locked in disconnected condition. The locking arm may extend downwardly, laterally, or upwardly, depending upon the positioning of the meter base.

Some changes may be made in the construction and arrangement of my means for preventing the unauthorized use of electricity through a meter without departing from the real spirit and purpose of my invention, and it is my intention to cover by my claim, any modified forms of structure or use of mechanical equivalents which may be reasonably included within its scope.

I claim:

A means for connecting or disconnecting the electrical circuitry of an electricity use meter having a base portion with rearward and forward sides and a detachable head portion with rearward and forward sides, comprising, in combination, said meter base portion having four female socket terminals in its forward side, said meter head portion having four terminal prongs extending rearwardly from its rearward side, a cup housing having rearward and forward sides detachably secured to said meter between said meter base portion and said meter head portion, said cup housing having its rearward side positioned adjacent the forward side of said meter base portion and its forward side positioned adjacent the rearward side of said meter head portion, said cup housing having four spaced apart terminal prongs on its rearward side extending rearwardly therefrom which are received by said four female socket terminals in said meter base portion respectively, said cup housing having four spaced apart female socket terminals in its forward side which receive said four terminal prongs of said meter head portion respectively, means directly electrically connecting two of said terminal prongs of said cup housing, respectively, with two of said socket terminals of said cup housing, and a movable means in said cup housing electrically connecting the other two terminal prongs of said cup housing, respectively, with the other two socket terminals of said cup housing at times, said movable means having two spaced apart notches therein and a detachable key actuated locking means having a member capable of selective movement into each of the two notches.

References Cited by the Examiner
UNITED STATES PATENTS
2,606,232  8/52  St. John _____ 317—103

JOHN F. BURNS, *Primary Examiner.*